Jan. 18, 1938. C. A. RUESENBERG 2,105,932
FRICTION CLUTCH
Filed Feb. 7, 1936 2 Sheets-Sheet 1

Inventor:
Carl A. Ruesenberg
By Edward C. Gritbough
Atty.

Jan. 18, 1938.  C. A. RUESENBERG  2,105,932
FRICTION CLUTCH
Filed Feb. 7, 1936   2 Sheets-Sheet 2
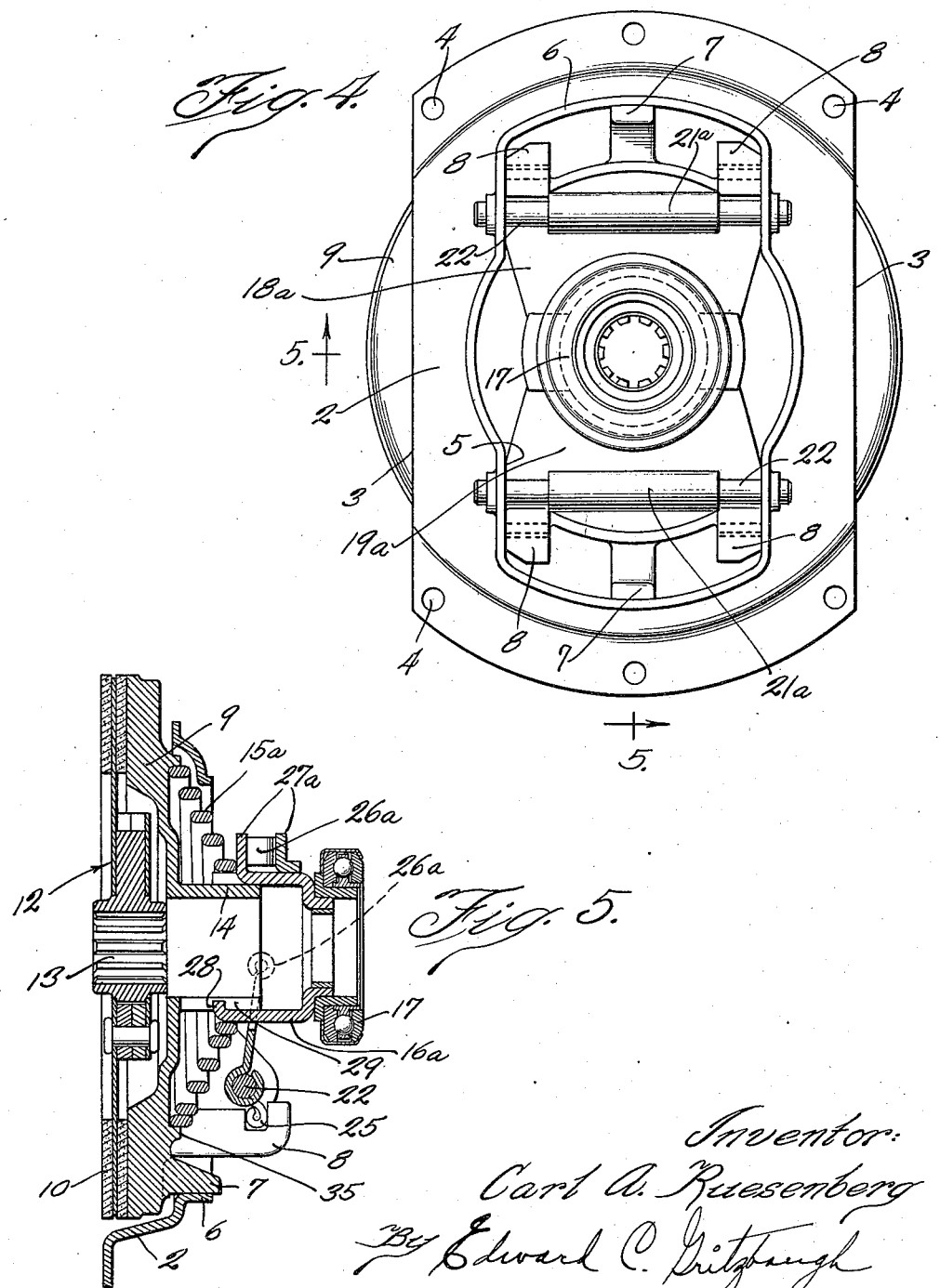

Patented Jan. 18, 1938

2,105,932

UNITED STATES PATENT OFFICE 2,105,932

FRICTION CLUTCH

Carl A. Ruesenberg, Rockford, Ill., assignor to Borg-Warner Corporation, Chicago, Ill., a corporation of Illinois Application February 7, 1936, Serial No. 62,745

8 Claims. (Cl. 192—68)

This invention relates to improvements in friction clutches and more particularly to friction clutches of the general type used in interconnecting the engine and transmission shafts of motor vehicles.

An object of the invention is to provide an improved friction clutch having relatively few parts, and which during manufacture may be machined and finished at minimum expense and with maximum accuracy, particularly as to the concentricity of the pressure plate and associated parts about the central axis of the clutch.

Another object is to provide an improved friction clutch which may employ a so-called open cover plate, thereby to provide for the discharge of any foreign matter or debris which may fall upon the clutch assembly under the action of centrifugal forces.

Another object is to provide an improved friction clutch wherein the operating sleeve carrying the anti-friction collar is permanently mounted on and forms a part of the clutch assembly independent of the transmission shaft. This feature is considered of major importance since it enables the entire clutch to be manufactured as a unit, and presented in its entirety to the manufacturer for assembly upon the flywheel of the crank-shaft of the motor vehicle under construction.

A further object is to provide an improved friction clutch wherein those moving parts subjected to maximum wear are so formed and arranged one relative to another as to enable the use of needle bearings with minimum labor and expense in manufacture.

A further object is to provide an improved friction clutch incorporating centrifugal weights serving to augment the pressure of the clutch spring as the R. P. M. of the clutch assembly increases, wherein great flexibility of semi-centrifugal action of the clutch may be had and accurately predetermined during manufacture.

A still further object is to provide an improved friction clutch having two pressure plate operating levers each provided with two spaced points of pressure application to the pressure plate, thereby advantageously to distribute the forces applied during clutch release.

Other objects, advantages and uses of the invention will become apparent after reading the following specification and claims, and after consideration of the drawings forming a part of the specification herein:

Fig. 4 is a view similar to Fig. 1 of another form of the clutch; and

Fig. 5 is a sectional view along the right angle line 5—5 of Fig. 4.

Figures 1, 2, 3:
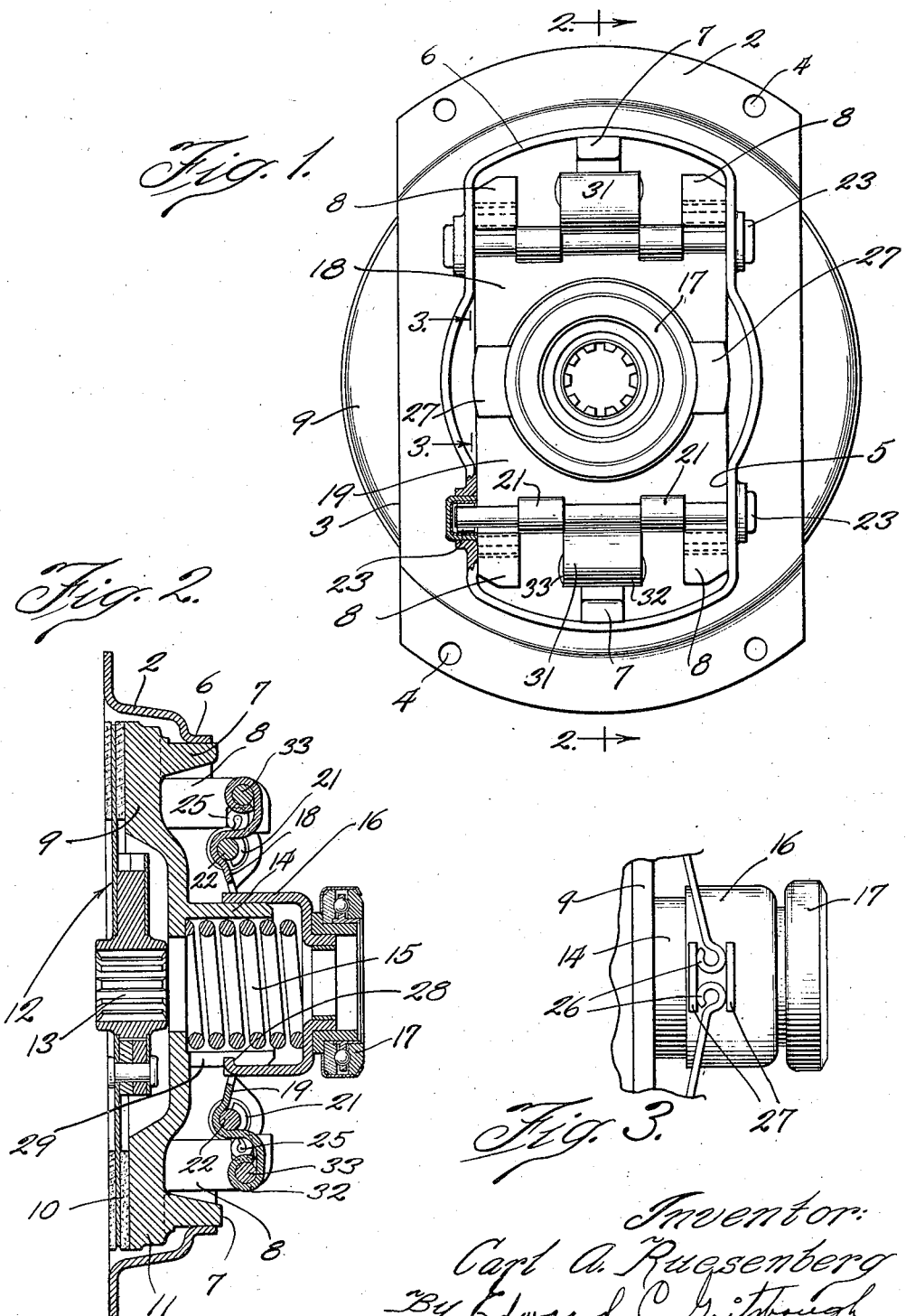
Fig. 1 is a rear end elevation of a clutch constructed in accordance with the invention.
Fig. 2 is a sectional view along the line 2—2 of Fig. 1.
Fig. 3 is a view along the line 3—3 of Fig. 1.

With reference to Figs. 1 to 3 inclusive, I have illustrated therein one form of my improved friction clutch. The clutch may comprise a so-called open cover plate 2 cut away at opposite sides 3 so as to expose the surrounded parts permitting foreign matter and debris which might otherwise accumulate therein, to be thrown away from the assembly during normal operation of the clutch. The plate 2 is intended for attachment directly to the flywheel of the motor vehicle (not shown) through the medium of bolt openings 4.

A substantially rectangular opening 5 is formed through the cover plate 2 and provided with a flanged marginal plate portion 6 to provide strength to the assembly and for the purpose of establishing a surface against which the locating lugs 7 and operating lugs 8 of the clutch pressure plate 9 may bear and slide. This simple arrangement of lugs and plate flange 6 provides for extreme accuracy in maintaining concentricity between the pressure plate and the central axis of the clutch assembly. Subsequent to finishing the surface 10 and peripheral wall 11, the outermost wall portions of the lugs 7 and 8 may be finished to accord therewith as to concentricity of the plate. The clearance between the lugs 7 and 8 and the flanged portion 6 of the plate being relatively small, ensures accurate placement of the pressure plate prior to and after assembly of the clutch in the vehicle.

In Figure 2 I have shown a clutch friction disc assembly at 12 which may be constructed after the manner of the conventional friction plate assembly and provided with a splined central opening 13 in the hub thereof adapted for engagement with the driving shaft of the motor vehicle transmission (not shown).

The pressure plate 9 is further provided with a concentric broken annular sleeve bearing portion 14 extending rearwardly from the rear face of the plate through and beyond the flanged portion 6 of the cover plate. The outer surface of the portion 14 may likewise be machined concentrically with the axis of the pressure plate prior to or at the same time the lugs 7 and 8 are machined and finished. The portion 14 serves a double function, first, that of receiving and confining the clutch compression spring 15, and of providing a bearing surface for the clutch-operating sleeve 16 as indicated in Figures 2 and 3. The sleeve 16 may carry thereupon an anti-friction collar assembly 17 constructed after a manner well known in the art. The collar 17 is adapted for engagement by the clutch pedal mechanism customarily employed for operation of friction clutches in motor vehicles.

My improved friction clutch embodies but two pressure plate operating levers as indicated at 18 and 19. These levers may be formed of heavy sheet steel suitably hardened and are of a width substantially equal to the width of the opening 5 in the cover plate 2 and substantially one-half the diameter of the pressure plate. Each plate is mounted and secured as indicated at 21 upon a fulcrum rod 22. The fulcrum rods 22 may be mounted at each end in needle bearing assemblies 23 supported upon the flanged portion 6 of the cover plate 2, thus to minimize friction during operation of the levers. Each of the levers is further provided with a pair of lug-engaging portions 25 (see Fig. 2) engageable with the two lugs 8 formed on the pressure plate 9 so that depression of the inner ends 26 (see Fig. 3) of the levers 18 and 19 will cause the lever portions 25 to move away from the cover plate 2 and to carry the pressure plate 9 therewith against the force of the spring 15. Operation of the levers 18 and 19 by the sleeve 16 may be carried out through the medium of spaced apart ears 27 formed on the outer wall of the sleeve 16 between which the adjacent ends 26 of each of the levers 18 and 19 are received. It will be noted that the ends 26 of each of the levers 18 and 19 lie one on each side of the axis of rotation of the pressure plate and cover assembly, thus to promote smooth operation of the levers under direct thrust from the sleeve 16 by the elimination of otherwise possible twisting movement of the levers during oscillation. Means for precluding relative rotation between the sleeve 16 and the pressure plate 9 may comprise an inturned lug 28 formed in the sleeve and engageable with a slot 29 in the portion 14 of the pressure plate as is illustrated in Figure 2.

In order that my improved friction clutch may respond in part to the centrifugal forces acting upon the clutch during operation and to provide for an increased pressure or packing of the clutch disc assembly 12 as the R. P. M. of the motor vehicle engine increases, I choose to form on each of the levers 18 and 19, and between their points of connection 21 with the fulcrum rods 22, an outwardly extending and offset integral wing 31. Each of the wings 31 has a rolled or beaded portion 32 at its outer end within which a weight 33 is carried. The weight 33 may comprise a lead slug pressed within the fold of the bead to maintain the same in place. With this construction it is a relatively simple matter for the clutch manufacturer to vary the semi-centrifugal operating characteristics of the clutch by the simple expediency of varying the degree of offset of the wings 31 as well as the mass of the weight members 33.

A friction clutch constructed as herein described presents a complete unit assembly necessitating no special preparation by the motor vehicle manufacturer of the parts upon which the clutch is to be mounted other than the provision of proper threaded bores in the engine flywheel. This is made possible by the mounting of the clutch operating sleeve 16 directly upon the sleeve 14 instead of upon the transmission shaft as has sometimes been the practice in prior art constructions.

At all times during operation of the clutch the relatively heavy pressure plate 9 will be maintained in exact concentricity with its axis of rotation, thus to minimize vibration due to rotational inertia of the parts, and its relationship to the cover plate 2 will remain fixed except for its operative movement along its said axis. This advantage is attributable to the fact that the machined portions of the guide lugs 7, the periphery of the plate 9 as well as its friction face, and the outer surface of the sleeve 14 may be finished virtually in one multiple machine operation, that is, one surface may be machined with exactness as to its relationship to each of the other surfaces. All of the machining and finishing operations of my improved clutch represent simple well known operations, and none require complex machine equipment or extraordinary skill and precautionary measures.

Although there are but two of the clutch operating levers, 18 and 19 respectively, each provides for two spaced apart pressure plate engaging lever portions. It is thus possible to employ needle bearings for the two fulcrum shafts of the two levers without entailing unwarranted expense in construction, an arrangement which might not be economically practical in the event that four such levers were to be employed. My improved clutch lever assembly operates with all of the advantages of a quadruple lever assembly, but possesses the simplicity of a two-lever assembly, and in addition the rigidity that comes by the broadening of the lever beam.

In addition to operation as a spring operated friction clutch, I have provided by a simple expedient for semi-centrifugal operation of the clutch plate 9 by the provision of the weighted slugs 33 fixed in the wings 31. As heretofore stated, the degree of offset of the wings 31 and the mass of the weights may be carefully predetermined at manufacture to fix the operating characteristics of the semi-centrifugal properties of the clutch.

In Figures 4 and 5 I have illustrated another form of my improved clutch wherein parts employed in the assembly of Figures 1 to 3 bear similar reference numerals. Parts which differ in construction bear the same numeral with the suffix "a".

Referring to Figures 4 and 5, the clutch spring comprises a helical pancake spring 15a interposed between the pressure plate 9 and the adjacent of the pairs of ears 27a on the clutch operating sleeve 16a. An annular boss 35 may be formed on the pressure plate 9 to confine the spring 15a against expansion and to locate the spring concentrically of the axis of the plate.

The operating levers 18a and 19a are tapered inwardly toward their ends 26a, and but a single retaining portion 21a is formed upon each of the levers to fix the levers upon their fulcrum shafts 22 respectively. In this form of the clutch I have omitted the semi-centrifugal feature and therefore the wings 31 with their weighted slugs 33.

The operation of the clutch assembly of Figures 4 and 5 and the advantages attributable thereto are substantially those described in connection with the clutch assembly illustrated in Figures 1 to 3 inclusive with the exception that the clutch does not possess semi-centrifugal operating characteristics.

I claim:

1. A friction clutch comprising, a cover plate, a pressure plate mounted for axial movement on said cover plate, a compression spring urging said pressure plate in one direction along the axis thereof, levers for moving said pressure plate against the force of said spring, and a lever operating sleeve slidably mounted on said pressure plate and engageable with said levers, said spring being so arranged relative to the clutch parts that one end thereof bears directly on the pressure plate and the other end bears directly upon said sleeve.

2. A friction clutch comprising, a cover plate, a pressure plate mounted for axial movement on said cover plate, a compression spring urging said pressure plate in one direction along the axis thereof, levers for moving said pressure plate against the force of said spring, and a lever operating sleeve slidably mounted on said pressure plate and engageable with said levers, said pressure plate being formed with an annular projection forming a bearing for said sleeve, and said spring being located within the confines of said annular projection.

3. A friction clutch comprising, a cover plate, a pressure plate mounted for axial movement relative to said cover plate, spring means urging said pressure plate in one direction along the axis of said cover plate, and a pair of diametrically opposed levers pivotally mounted on said cover plate for moving said pressure plate against the action of said spring means, said pressure plate having a plurality of spaced apart and rearwardly extending lugs formed thereon, said levers each having a plurality of spaced apart portions each one engageable with one of certain of said plurality of lugs whereby to distribute the forces applied to said pressure plate by said levers over a relatively large area of the plate, said lugs cooperating collectively with said cover plate independently to locate the pressure plate concentrically about the axis of rotation of said cover plate.

4. A friction clutch comprising, a cover plate, a pressure plate mounted for axial movement relative to said cover plate, spring means urging said pressure plate in one direction along the axis of said cover plate, and a pair of diametrically opposed levers pivotally mounted on said cover plate for moving said pressure plate against the action of said spring means, said pressure plate having a plurality of spaced apart and rearwardly extending lugs formed thereon, said levers each having a plurality of relatively widely spaced apart portions each one engageable with one of said plurality of lugs whereby to distribute the forces applied to said pressure plate by said levers over a relatively large area of the plate, said lugs having a sliding engagement with said cover plate over relatively large and flat areas of greater width than the thickness of said cover plate and all parallel to the longitudinal axis of the pressure plate.

5. A friction clutch comprising, a cover plate, a pressure plate mounted for axial movement relative to said cover plate, spring means urging said pressure plate in one direction along the axis of said cover plate, a pair of diametrically opposed levers pivotally mounted on said cover plate for moving said pressure plate against the action of said spring means, said levers each having two spaced apart points of engagement with said pressure plate whereby to distribute the force applied to said plate by said levers over a relatively large area of the pressure plate, wings formed on the said levers between said spaced points of engagement with said pressure plate, and weight members carried by said wings whereby to utilize centrifugal force to augment the force of said spring means as the R. P. M. of the clutch about said axis is increased.

6. A friction clutch comprising, a cover assembly adapted to be fixed to the flywheel assembly of a motor vehicle engine, a pressure plate mounted for axial movement relative to said cover assembly, means restraining said pressure plate against lateral movement relative to said cover plate assembly and providing a sliding bearing therefor, a driven disc located on the flywheel side of said pressure plate, spring means urging said pressure plate in the direction of said disc, a pair of diametrically opposed levers pivoted on said cover assembly, each of said levers having a plurality of points of engagement with said pressure plate and each having a plurality of fingers, and a lever operating member engaged with all of said lever fingers.

7. A friction clutch, as defined in claim 6, wherein said levers are formed of flat sheet metal and are of a width at their pressure plate engaging ends substantially equal to one-half of the diameter of said pressure plate.

8. A friction clutch, as defined in claim 6, wherein the fingers on each of said levers engage with said operating member on opposite sides of the axis of rotation of said pressure plate and cover assembly.

CARL A. RUESENBERG.